United States Patent [19]

Müller et al.

[11] 4,345,489

[45] Aug. 24, 1982

[54] HYDRAULIC CONTROL SYSTEM FOR SERVOS IN AUTOMATIC TRANSMISSIONS

[75] Inventors: Alfred Müller, Leonberg; Manfred Schwab, Gerlingen; Meinrad Feder, Schwieberdingen; Achim Schreiber, Schwieberdingen; Joseph Sauer, Schwieberdingen, all of Fed. Rep. of Germany

[73] Assignee: Robert Bosch GmbH, Stuttgart, Fed. Rep. of Germany

[21] Appl. No.: 111,993

[22] Filed: Jan. 14, 1980

[30] Foreign Application Priority Data

Jan. 12, 1979 [DE] Fed. Rep. of Germany ....... 2901051

[51] Int. Cl.$^3$ ............................................. F16H 3/74
[52] U.S. Cl. ............................... 74/752 A; 74/752 C; 74/866; 74/867
[58] Field of Search ................ 74/752 A, 878, 752 C, 74/752 D, 866, 867, 868

[56] References Cited

U.S. PATENT DOCUMENTS

| | | | |
|---|---|---|---|
| 3,247,740 | 4/1966 | Shuster | 74/752 D |
| 3,690,197 | 9/1972 | Sumiyoshi | 74/752 A X |
| 3,709,064 | 1/1973 | Schaefer | 74/752 A |
| 3,744,347 | 7/1973 | Kubo et al. | 74/752 A X |
| 3,747,438 | 7/1973 | Toyoda et al. | 74/752 A X |
| 3,938,409 | 2/1976 | Uozumi | 74/752 A X |
| 4,094,211 | 6/1978 | Espenschied | 74/866 |
| 4,253,346 | 3/1981 | Kuhnle | 74/752 A X |

FOREIGN PATENT DOCUMENTS

| | | | |
|---|---|---|---|
| 2557586 | 6/1977 | Fed. Rep. of Germany | 74/752 C |
| 2658195 | 4/1978 | Fed. Rep. of Germany | 74/752 C |
| 2703441 | 8/1978 | Fed. Rep. of Germany | 74/752 C |
| 2113159 | 9/1978 | Fed. Rep. of Germany | 74/752 A |
| 2039639 | 8/1981 | United Kingdom | 74/867 |

*Primary Examiner*—Leslie Braun
*Attorney, Agent, or Firm*—Michael J. Striker

[57] ABSTRACT

The invention pertains to a hydraulic control system for servos in automatic transmissions, which, in a known fashion, utilizes a main pressure valve to regulate the pressure within the control system and further utilizes a converter pressure valve to supply a hydrodynamic torque converter and the lubrication system. The servos (for example, the clutches) utilized in this type of automatic transmissions cooperate with electromagnetically actuated pressure regulating valves have a current-proportional response. These electromagnetic valves are actuated by electronic control signals generated by sensors which monitor various parameters during operation, making previously utilized sensors superfluous. By control of the pressure regulating valves the forward gear, the reverse gear or the neutral gear can be engaged in the simplest fashion. By means of a magnet valve associated with the main pressure valve the levels of pressure may be varied. It is also possible, via simple associated elements, to install an emergency system which during a failure of the electrical system allows the transmission to continue to operate.

5 Claims, 6 Drawing Figures

HYDRAULIC CONTROL SYSTEM FOR SERVOS IN AUTOMATIC TRANSMISSIONS

BACKGROUND OF THE INVENTION

The invention pertains to a hydraulic control system for servos (e.g. clutches) of automatic transmissions. In a known system of this kind, each servo is associated with a corresponding switching valve that opposes fluid pressure with spring pressure. When the spring pressure in the switching valve is overcome by a control pressure, the fluid pressure is transmitted to further valves and actuates the servos. A disadvantage of this system is the high expense of such valves, whereby the arrangement is not only expensive but also more prone to breakdown. Additionally, in known control systems a centrifugal governor, located on an output gear and connected to a regulating pump, a connecting rod to the gas pedal or a low pressure connection with a diaphragm pressure regulator along with mechanical links connected to the transmission by adjustable levers are necessary. The expenditure for these items is also great.

SUMMARY OF THE INVENTION

It is the object of this invention to provide a hydraulic control system for servos such as clutches which are used in automatic transmissions that does not require a high expenditure for the control elements of the system. Moreover, it is an object of the invention to provide a control system which can, using suitable electronic control apparatus, be placed in a emergency mode by an operator or automatically to enable a vehicle in which such an automatic transmission is installed to be moved to a nearby repair station even in the event of emergency.

These objects, along with others which will become apparent hereinafter, are achieved by the use of current-proportional regulating valves which are used to control the flow of hydraulic fluid to the bands or clutches used in an automatic transmission. In this system, these pressure regulating valves are energized and de-energized upon the selection of appropriate gears. Depending upon the various parameters which are conventionally taken into account in the operation of an automatic transmission (such as load, engine speed, and travelling speed) the pressure regulating valves are energized and de-energized in order to vary the hydraulic pressure applied to the servos within the transmission.

This invention is so designed that it is unnecessary to provide different pressure regulating valves for different applications. All the valves used herein are identical, enabling economies in manufacturing costs to be effected. Moreover, since the regulating valves operate in response to electrical currents, an emergency system which which keep the valves energized during an emergency can be used to ensure that the servos in an automatic transmission remain actuated even during an emergency, in order to allow the vehicle to be moved to a nearby repair station for repair.

The novel features which are considered as characteristic for the invention are set forth in particular in the appended claims. The invention itself, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
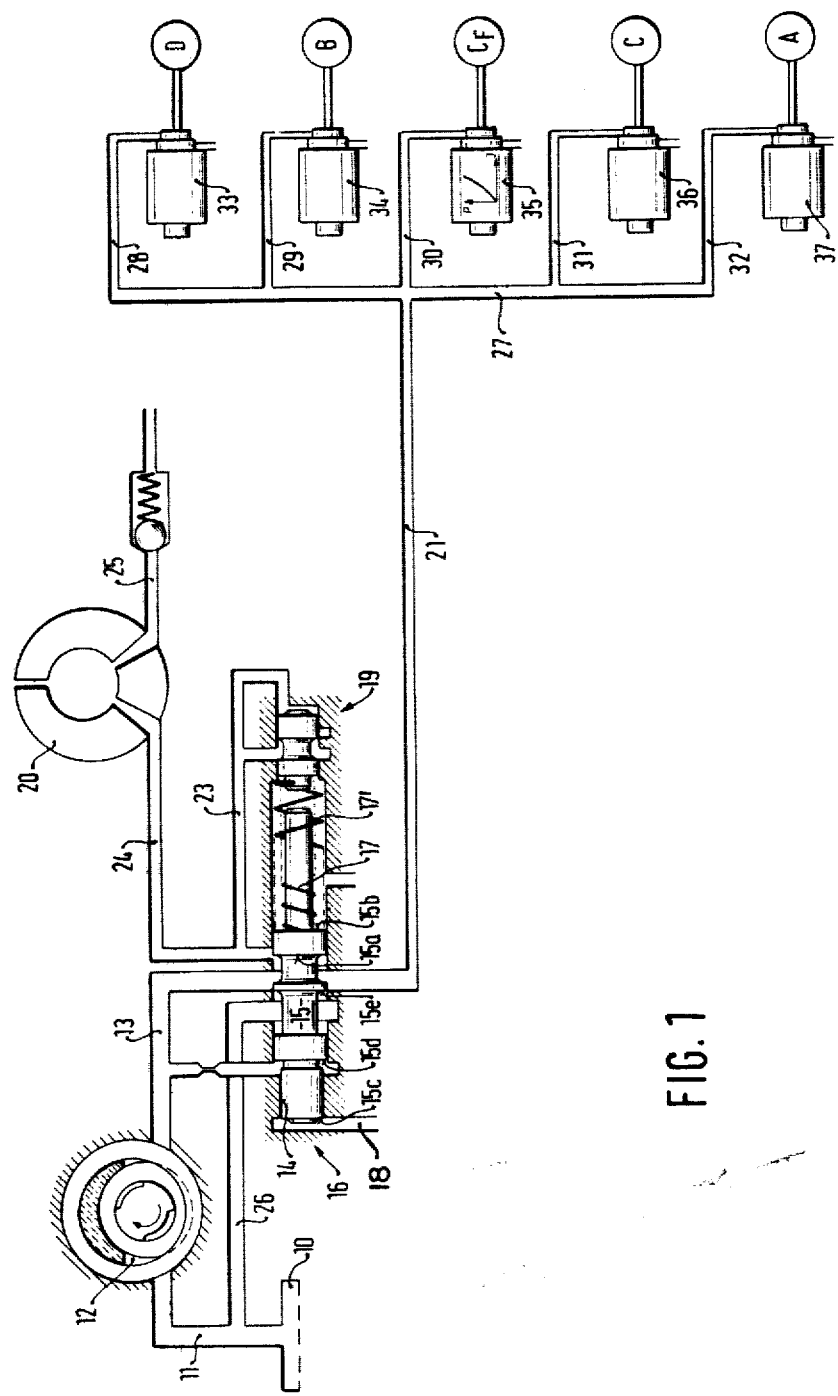
FIG. 1 shows a schematic diagram of a first embodiment of this invention.

In a known fashion, the control system has a pump 12 which draws hydraulic fluid through intake pipe 11 from reservoir tank 10. The pumps transmits this fluid via conduit 13 to an interior bore 14, which bore 14 is located on the inside of a main pressure valve 16 and in which bore a valve body 15 is tightly fitted. The valve body 15 is biased by a spring 17, which also acts upon converter valve 19. From the bore 14 in which the valve body is located, a conduit 24 leads to a hydrodynamic torque converter 20. The pump 12 supplies hydraulic fluid in a main pressure conduit 21 which leads away from the bore 14, whereby the pressure in main pressure conduit 21 is load-controlled by the main pressure valve 16. The valve body 15 maintains a suitable main pressure by venting surplus hydraulic fluid in torque converter intake line 24 in dependence upon the pressure exerted upon the valve body by spring 17' and further in dependence upon the load-controlled modulated pressure exerted on surface 15b, and finally on the main pressure exerted on surface 15c and 15d. When the total pressure delivered by the pump 12 is greater than the sum of the pressure required by torque converter 20 and the pressure required to supply any deficiency in pressure in the control arrangement to operate the couplings and to supply them with adequate pressure—see below—another control edge 15e of valve body 16 opens a connection from the main pressure line 21 to a return line 26 which is connected to the intake pipe. Control edge 15e closes the connection from the main pressure line 21 to the return line 26 when the pressure provided by pump 12 is smaller than the pressure which is required to be maintained in the torque converter 20 and the pressure which is required to supply the rest of the control arrangement. A torque converter supply 23 travels over the main pressure valve 19 and conduit 24 to the hydrodynamic torque converter 20, and is thence passed through conduit 25 to the rest of the lubricating system. Arrangements of this kind are well known and therefore will not be further described.

From main pressure line 21 the hydraulic fluid flows into a conduit 27, and is thereby distributed between shunt pipes 28, 29, 30, 31, and 32. These shunt pipes are connected to pressure regulating valves 33, 34, 35, 36, and 37, each of the pressure regulating valves being connected to a servo (or clutch) arranged in the order D, B, Cf, C, A. The pressure regulators 33 through 37 are electromagnetically actuated pressure regulators with current-proportional response. This is indicated by the small diagram located on pressure regulator 35, in which diagram the pressure P is shown along the ordinate and the current intensity J is shown on the abcissa. The pressure regulators are so controlled (by an unshown electronic control system) that the desired gears—forward, reverse, and neutral—can be selected. Necessary parameters such as the influence of load, travel speed and engine speed are detected by the appropriate sensors which can be inductive, optical or other electrical devices which are connected to the electronic control system. In this fashion, previously necessary sensors such as centrifugal governors on the output gear and the eventually necessary regulating pumps, connections to the gas pedal, low pressure connections with diaphragm pressure regulators and like mechanical links with adjustable levers which are connected to the transmission are rendered unnecessary. The current-proportional operation of the pressure regulators 33 through 37 is advantageous, since upon an eventual failure of the electronic control system the pressure regulators will not be subjected to maximum pressure and therefore the clutches will be simultaneously operated. The pressure regulators are all identical and calibrated for the same pressure level, causing economies in manufacture to be effected. A pressure regulating valve of this type is described at the end of the text. The maximum pressure level in the clutches can, via appropriate limitations on current, be held to a appropriate pressure for the pressure regulators. It is unnecessary to provide a control for the rear reverse gear surface 15c as was previously necessary. Canal 28 is open to the atmosphere.

Figure 2:
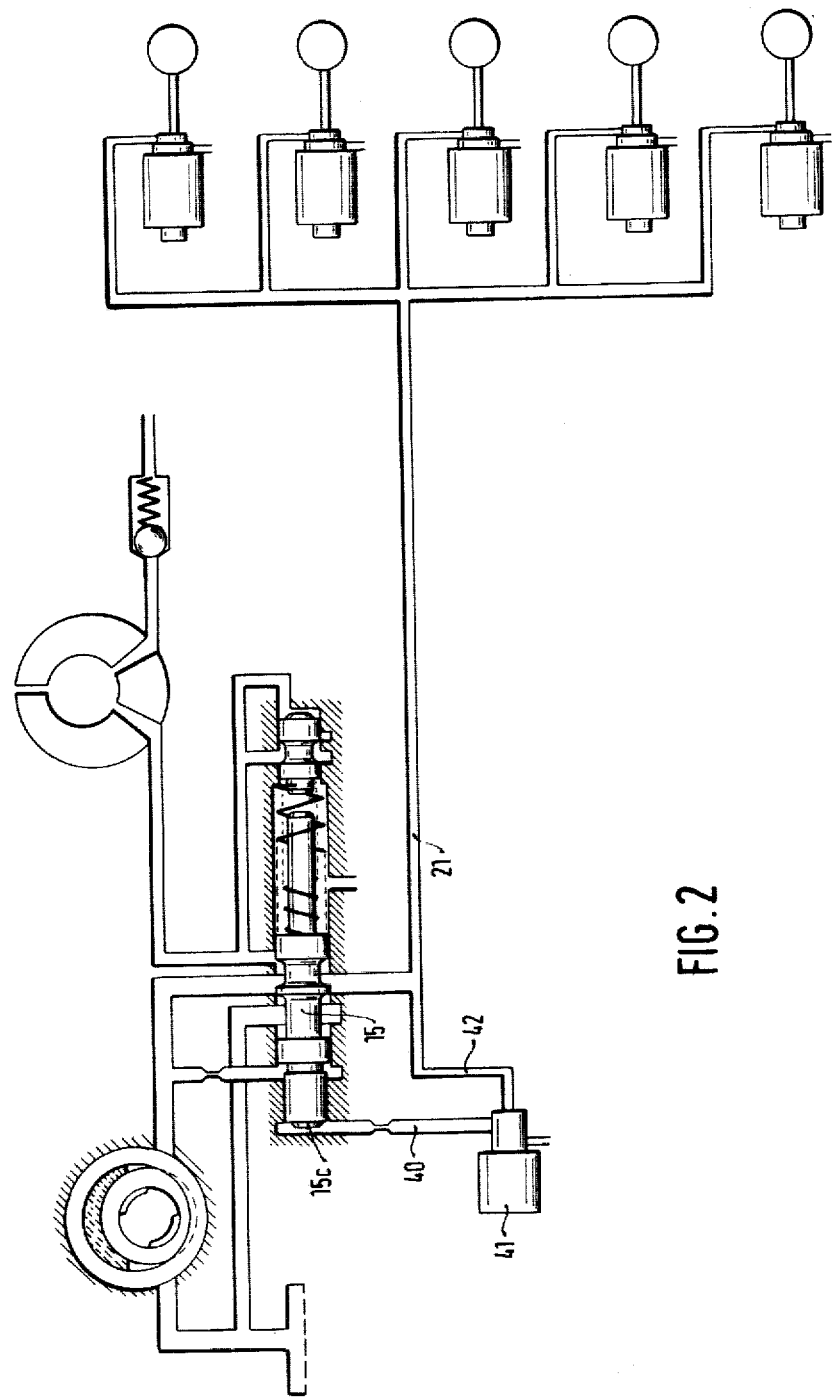
FIG. 2 shows a schematic diagram of a second embodiment of this invention.

It is also possible to pressurize the reverse gear surface 15c of the main pressure valve, in order to avoid unnecessary burdening of the couplings for the forward gears. This pressurization occurs by means of an electromagnetic valve 41 having an output 42 which is connected to the main pressure line. (see FIg. 2). This measure allows the pump 12 to operate against a high pressure only when the reverse gear is engaged, and thus makes the advantages of other previously known arrangements available in this case. Power loss in normal operation is thus reduced. An arrangement of this type is advantageous if the pressure regulators are manufactured differently from each other. It is also advantageous if valve 41 is constructed as a 3/2 electromagnetic valve.

Figure 3:
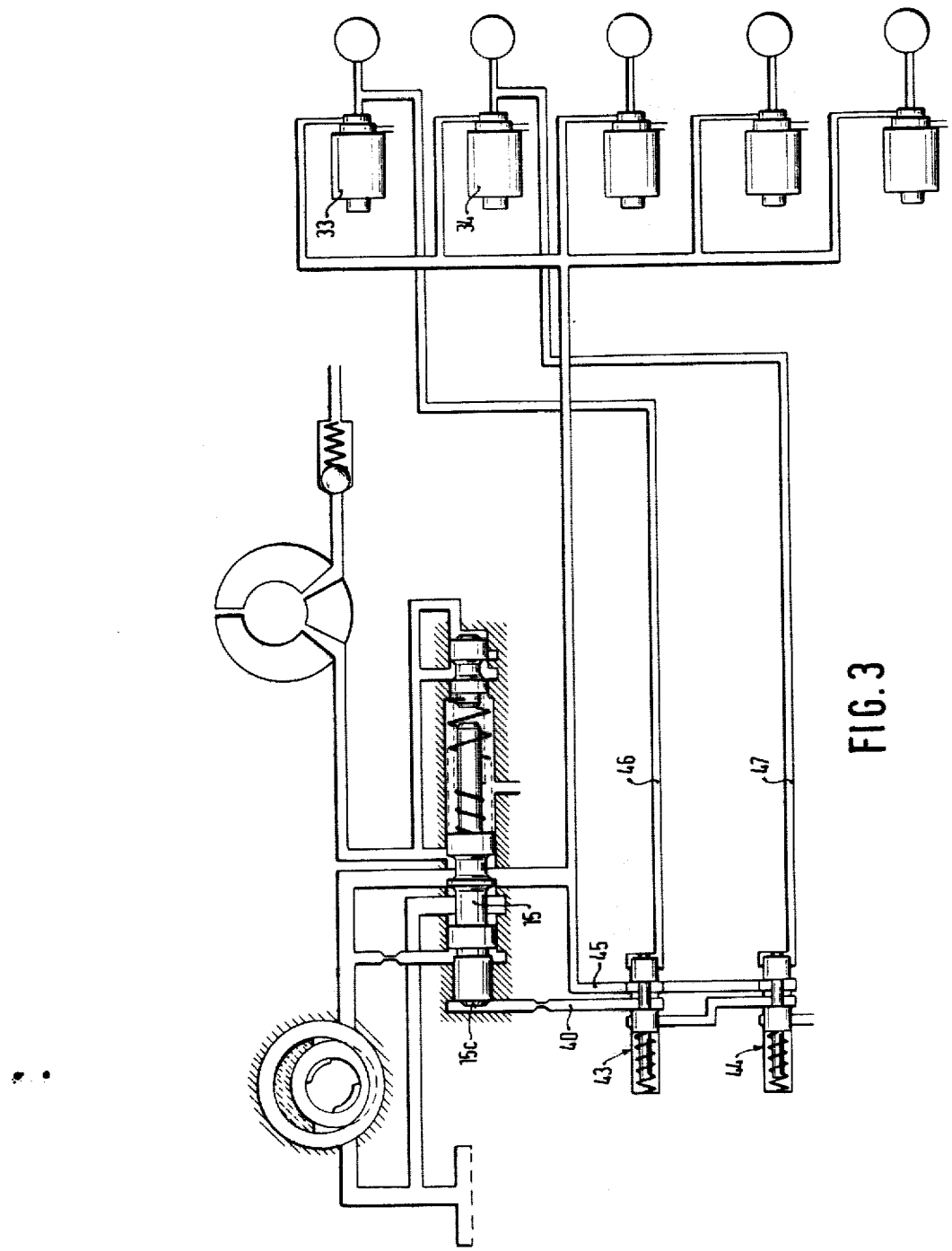
FIG. 3 shows a schematic diagram of a third embodiment of this invention.

The reverse gear, in which couplings B and D are operated, can be selected purely hydraulicly by means of two logic valves 43 and 44. (see FIG. 3). These cooperate with the reverse gear surface 15c of the main pressure valve 16 and are connected to the main pressure line via a conduit 45. The logic valves are supplied by lines 46 and 47 which are, respectively, connected to the exhausts of pressure regulators 33 and 34 which are associated with reverse gear. Logic valves 43 and 44 are simply valve bodies that are biased by a spring. They direct hydraulic fluid from line 45 through line 40 to the reverse gear surface 15c of the valve body 15. This embodiment of the control system has the advantage that upon failure of the electronic control system no additional measures must be taken to maintain the various pressure levels in the system.

Figure 4:
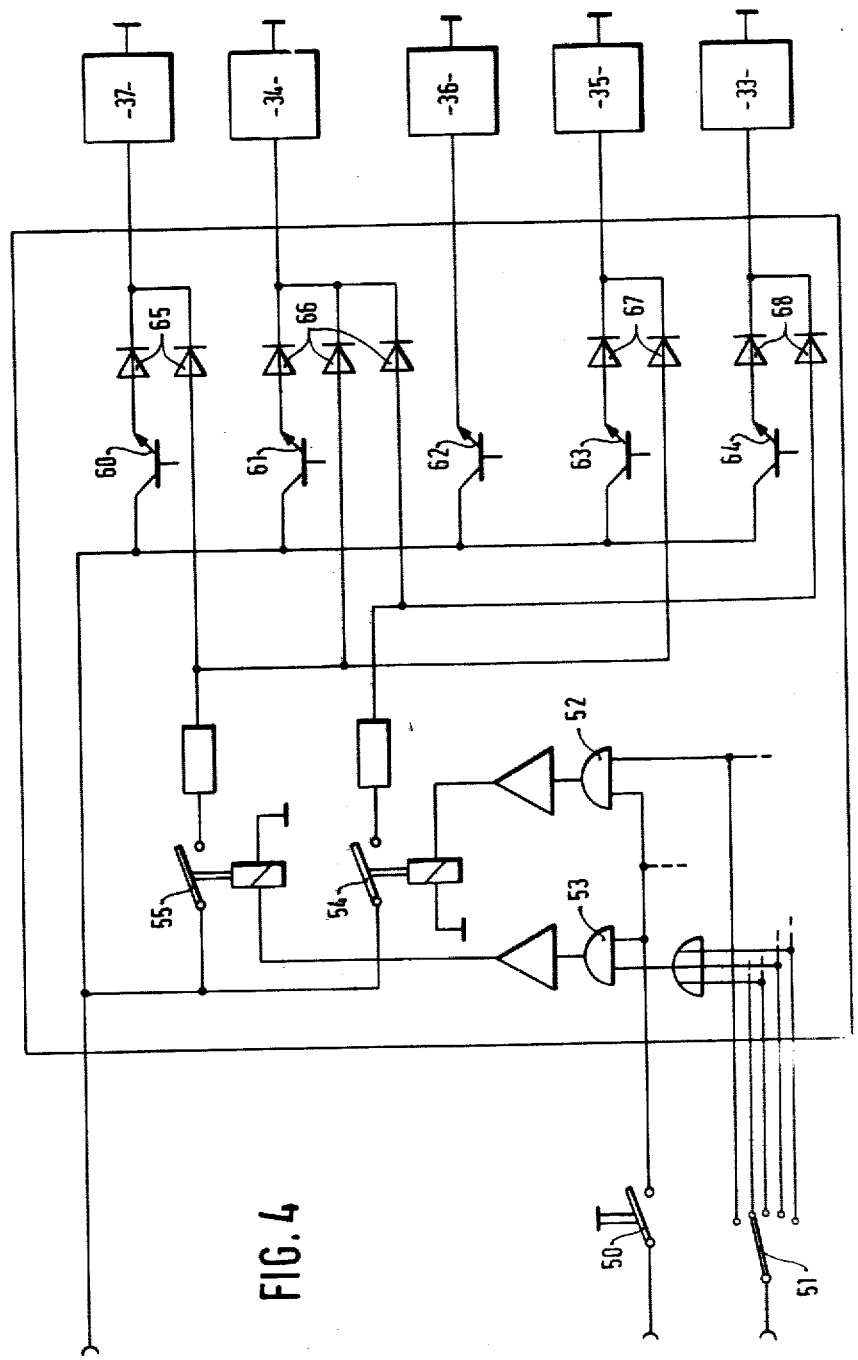
FIG. 4 shows an electrical schematic diagram of an emergency control system which can be used to place this invention into an emergency mode.

For the security of the driver and the vehicle in the case of a failure of the electronic control system an emergency system is provided. Such a system is shown, in schematic form, in FIG. 4. Upon failure of the electronic control apparatus a switch 50 can be operated either automatically or by a manually operable lever, that causes the system to go into an emergency mode. Furthermore, a multiple-position switch 51 is provided for the various gears of reverse, neutral, and forward gears 1 through 3. The outputs of the two switches are connected to AND-gates 52 and 53, that are connected, respectively, to the coils of relays 54 and 55. Relay 55 is provided for use when the forward gear is selected, while relay 54 is provided for the reverse gear. Each of the pressure regulators 33 through 37, to which a coupling is connected, is controlled by the collector of one of the transistors 60, 61, 62, 63, and 64, is also controlled by the diode networks 65, 66, 67, and 68. When the emergency mode is selected, the transmission goes automatically into the third gear whether the selector switch 51 is connected to the first gear, the second gear, or the third gear. In this fashion, the vehicle is still maneuverable and can be moved to the nearest repair shop. This arrangement guarantees that in an emergency the most that will happen is the engagement of an undesirably high gear.

In a similar extension of the diode networks and through two accompanying relays first and second gear may also be hand selected. This has the advantage that the vehicle may be operated during travel in a lower gear. In case a magnet valve is displaced, a rise in pressure will result and therefore this must be included in the emergency mode. This results from the hydraulic solution utilized.

Figure 5:
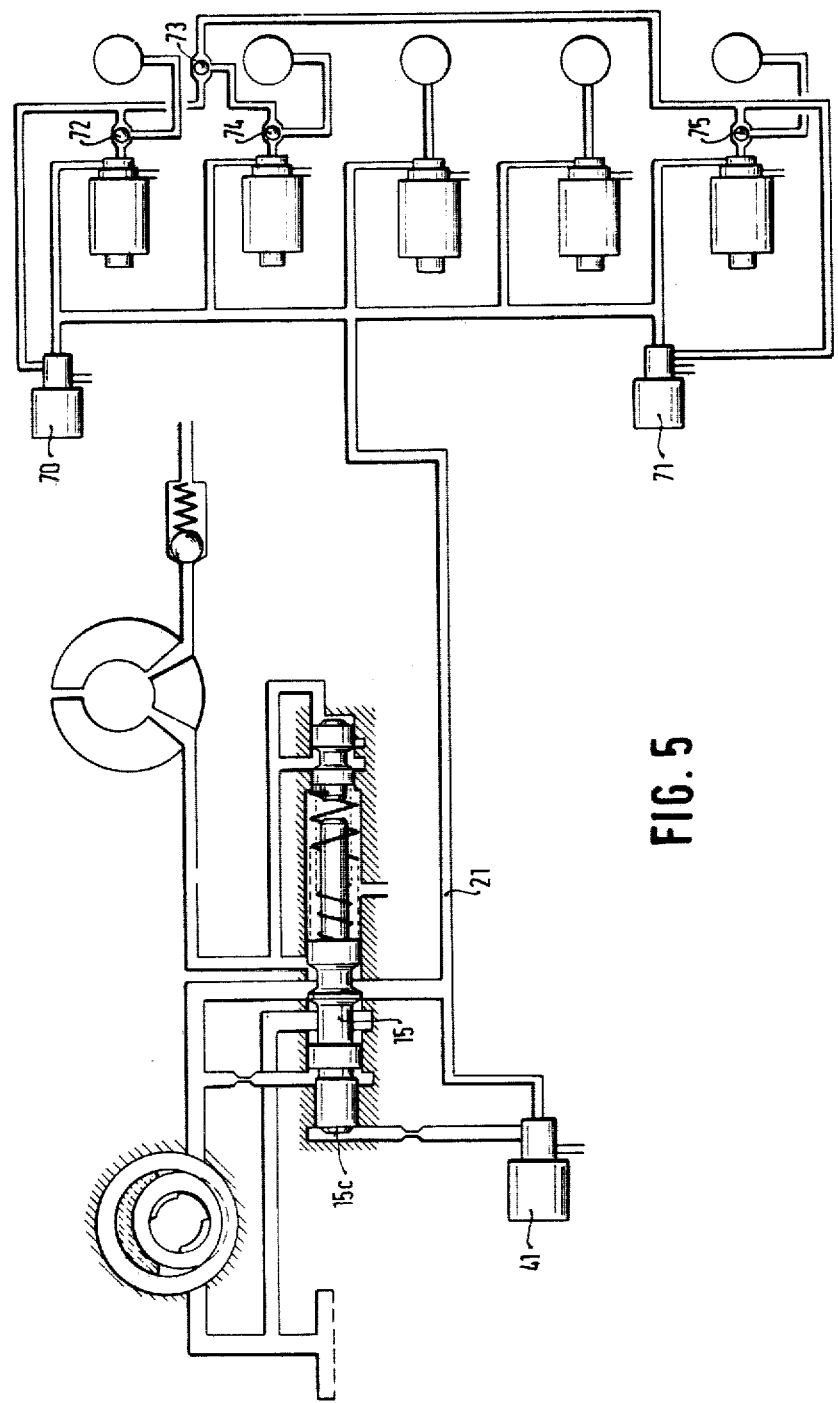
FIG. 5 shows a schematic diagram of a fourth embodiment of this invention.

The embodiment shown in FIG. 5 shows a further possibility of an emergency mechanism which is provided for the case in which one or more of the pressure regulators 33 through 37 fails. In this example, 2 associated magnet valves and 4 ball-containing check valves are provided which, under the influence of magnetic valves 70 and 71 operated the couplings for the third gear or the couplings for the reverse gear. The magnetic valves 70 and 71 are preferably 3/2 valves, and are associated with clutches D and A. The clutches B and D for reverse gear are connected to check valves 72, 73 and 74 while clutch A is connected to check valve 75. When no electronic control exists, both magnet valves 70 and 71 are closed, which is why magnetic valve 41 is provided for the rise in pressure of the main pressure regulating valve which occurs in reverse gear; by means of magnet valve 41 the reverse gear surface 15c—as in the embodiment shown in FIG. 2—is relieved, which enables the necessary raise in pressure for the selection of reverse gear to be achieved. The control for both magnet valves 70 and 71 can follow the operation of the various pressure regulators, or can occur in parallel thereto, which latter arrangement has the advantage that in the event that an intermediate magnet valve fails, the still functional pressure regulators can still serve to operate in an emergency mechanism, providing double security. The electronic control is so arranged that the magnetic valves and the pressure regulators do not operate simultaneously.

With references to the springs 17 and 17', the two springs are connected to each other behind the elongated bar which is part of the valve body 15 and extends towards the right in the drawings. This elongated bar serves the purpose of preventing the torque converter valve 19 from falling into the chamber which contains the springs. This chamber is connected by a line (not shown) to tank 10. Thus, valve 19 regulates the pressure in the system by applying pressure to spring 17 under the influence of the pressure prevailing in line 23. It is also noteworthy that the pressure regulating valves in this invention operate clutches in the transmission. However, they may also be used to operate bands in the transmission. The constrictions in the various lines shown are damping restrictions.

Figure 6:
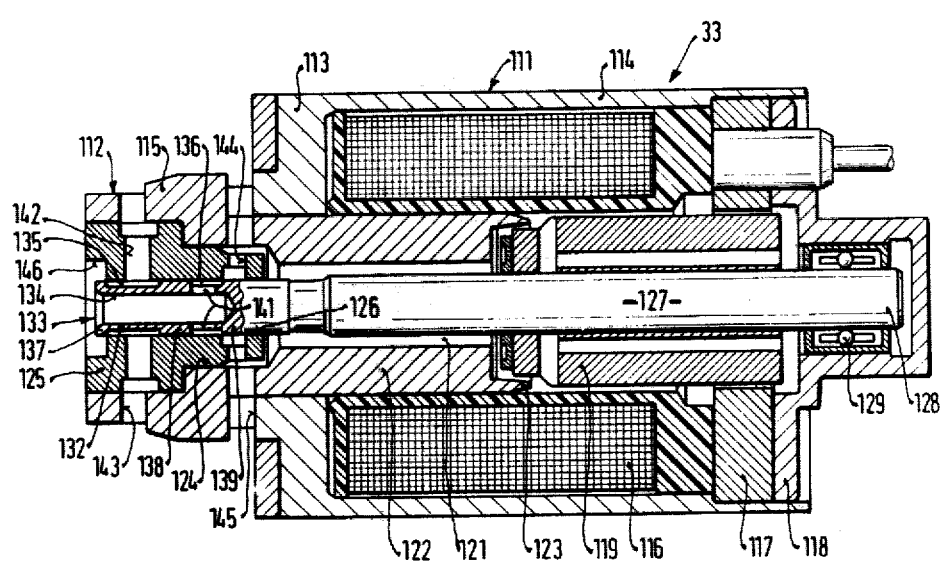
FIG. 6 shows a cross-sectional view of one of the pressure-regulating valves used in this invention.

FIG. 6 shows one of the pressure regulating valves 33 through 36 which has a magnet 113 and a valve portion 112. The valve has a housing 114 which is composed of a magnet housing 114 which extends into the valve housing 115. The magnetic housing 114 carries a winding 116, and a magnetically conductive plate 117 along with a cap 118 which all enclose an armature 119 inside an interior volume 121 located in the interior of the valve. The valve housing 115 has a section 122 which extends into the region 121 and is tube-shaped, overlapping a portion of the armature at end 123 and extending into the region of magnetic influence of the winding 116. In valve housing 115, a unitary plug 125 manufactured of non-magnetic material is inserted into bore 124. The plug has a central elongated bore 126. The armature is fixed to an elongated shaft 127 of which one end 128 is supposed by a bearing 129 located in cap 118. On the other end of the shaft 127, namely end 132, the shaft is formed in to a hollow slide 133 and rides in elongated bore 126 which is located in the plug 125. The hollow slide 133 contains a central bore 134 and is undercut on its exterior to form valve lands 137, 138, and 139. The undercut regions, namely recesses 135 and 136, are cylindrical in shape. Recess 136 communicates with the interior of elongated bore 134 by openings 141. That portion of plug 125 adjacent the recess 135 bears a plurality of canals 142 which extend radially outwardly relative to the elongated bore 126. All of these canals are connected to supply port 143 in the valve housing 115. In the region of valve land 139 the plug 125 has cavities 144, which communicate with return port 145 within the valve housing 115. A recess in the left-hand portion of the plug 125 forms a servo port 146.

The operation of the pressure regulating valve 33 is as follows: The pressure prevailing in servo port 146, which presses against end 132 of the shaft 127, acts against the force exerted on armature 119 by the coil 116, which tends to draw the armature 119 to the left as viewed in FIG. 6. If both forces are in equilibrium, the servo port 146 is isolated from supply port 143 and is also isolated from return port 145. When the pressure in the servo port 146 exceeds the force exerted on the armature 119, the shaft 127 is pushed to the right as is shown in FIG. 6, so that land 139 is not interposed between recess 136 and return port 145. Thus, hydraulic fluid can pass through bore 134, openings 141 and recess 136 to flow out of return port 145, until equilibrium has been established and the shaft 137 once again moves to its original position towards the left-hand margin of FIG. 6.

If, however, the force exerted by the coil 116 upon armature 119 exceeds the hydraulic pressure prevailing inside servo port 146, the shaft 127 moves to the left as viewed in FIG. 6, so that land 137 is not interposed between the plug 125 and the interior of the servo port 146. Thus, hydraulic fluid can flow into the regulated supply 143, through recess 135, and into servo port 146 in order to build up pressure therein until such time as equilibrium has been established. In that case, the shaft 127 will move once again towards the right-hand margin of FIG. 6, and such flow will cease. By varying the current passing through coil 116, the pressure in servo port 146 can be regulated.

We claim:

1. A hydraulic control system for a plurality of switching elements of an automatic transmission including a main conduit, a main pressure valve to regulate the pressure in the main conduit and a torque converter valve, comprising a plurality of electromagnetically actuated pressure regulating valves connected in parallel to said main pressure conduit, each pressure regulating valve having a corresponding variable fluid opening, the variation of said opening being proportional to applied electrical current, and each switching element being connected to the main pressure conduit through one of said pressure regulating valves.

2. An arrangement according to claim 1, characterized in that the main pressure valve is associated with an electromagnetically acutated magnetic valve (41), whereby various levels of pressure, and particularly an increase in pressure in reverse gear is achievable.

3. An arrangement according to claim 1, characterized in that the main pressure valve is associated with two logic valves whereby the pressure level upon the selection of the reverse gear can be raised.

4. An arrangement according to claim 1, characterized in that the main pressure valve is associated with a magnet valve whereby the main pressure valve can be subjected to various levels of pressure and the switching elements for example, for the reverse gear are associated with an electromagnetic valve and three check valves utilizing ball checks and the switching element for third gear is associated with a magnetic valve and a ball check, with both magnet valves connected in parallel to the main pressure line.

5. An arrangement according to claim 1, characterized in that an electrical switch is provided for an emergency program, as is a multi-position switch for the various gears, whereby these switches, through an AND-gate and two relays along with final outputs and diode networks operate on the switching elements.

* * * * *